United States Patent [19]

Fox

[11] 3,824,376

[45] July 16, 1974

[54] DOCUMENT RESTRAINING AND READING APPARATUS

[75] Inventor: Ralph W. Fox, Blue Bell, Pa.

[73] Assignee: Philco-Ford Corporation, Blue-Bell, Pa.

[22] Filed: May 10, 1973

[21] Appl. No.: 358,983

[52] U.S. Cl. ...................... 235/61.11 J, 235/201 FS

[51] Int. Cl. ............................................ G06k 7/02

[58] Field of Search .............. 235/61.11 J, 200, 201

[56] References Cited

UNITED STATES PATENTS 2,510,552 6/1950 Carroll et al. ................ 235/61.11 J 3,627,992 12/1971 Davies et al. ................ 235/61.11 J

*Primary Examiner*—Daryl W. Cook

*Attorney, Agent, or Firm*—Robert D. Sanborn; Carl H. Synnesvedt; Harry W. Hargis, III

[57] ABSTRACT

Document handling apparatus in which a document reader is disposed to scan indicia carried by a document occupying a perforated platform at the reading station. A vacuum manifold is cooperable with the perforations in said platform to reduce the pressure at the platform sufficiently to maintain the document in position to be scanned by the reader. A single blower serves several purposes, providing cooling air for electronic equipment included in the reader, and inducing the vacuum at the reading station which serves to keep the documents secured in proper position on the platform. Conduit structure, including first and second branches, is coupled with the blower to provide for drawing of air through said branches. One branch is connected to the vacuum manifold and the second branch presents sufficient restriction to insure that the blower induces, through the first branch, a pressure low enough to hold the document in position, while yet drawing sufficient air through the second branch and across the electronic equipment to cool the same. The output of the blower also is used to provide cooling air for the motor of apparatus which serves to remove documents from the platform.

6 Claims, 2 Drawing Figures

DOCUMENT RESTRAINING AND READING APPARATUS

BACKGROUND OF THE INVENTION

Certain known types of optical character recognition apparatus (OCR) utilize equipment which consumes considerable power with consequent generation of heat during the reading of documents, and dissipation of this heat has presented problems. A principle source of heat is the electronic equipment which forms part of the document reader, as is the motor-driven means which is used to remove documents from the reading station. The latter means may consume considerable energy, particularly in apparatus in which the motor is reversible in order to provide for rejection of documents which are so shaped or disposed that they might interfere with proper functioning of the equipment.

Efforts have been made to overcome the heat problem by providing separate blowers for cooling certain critical elements. These blowers are in addition to the blower, or vacuum pump, which is used to create a vacuum at the reading station, and the resultant multiplication of equipment is disadvantageous from the standpoint of both cost and complexity.

SUMMARY OF THE INVENTION

The primary objective of my invention is to eliminate the mentioned heat problems by provision of a novel system in which a single blower is coupled to draw air through a pair of conduit branches, one of which includes the package of electronic equipment, while the output of the blower is utilized to cool the motor which drives the document removal apparatus. By the simple expedient of providing predetermined restriction in the branch which contains the electronic equipment, I am able to insure passage of sufficient cooling air in air exchange relation with the electronic package, while not interfering with establishment of the desired low pressure in the vacuum manifold. An advantage of the invention is that the degree of vacuum desired at the perforated platform may be adjusted merely by regulating the restriction, as long as sufficient capacity is maintained to insure adequate cooling of the package.

The apparatus of the invention lends itself particularly well to use in systems in which the electronic package is of such a nature as to produce the greatest heat when the document is in a position to be read. Under such conditions, the induction of air through the first branch is restricted by the presence of the document on the platform, thus maximizing the flow of air over the electronic equipment during the reading operation.

DESCRIPTION OF THE PREFERRED EMBODIMENT

Figures 1, 2:
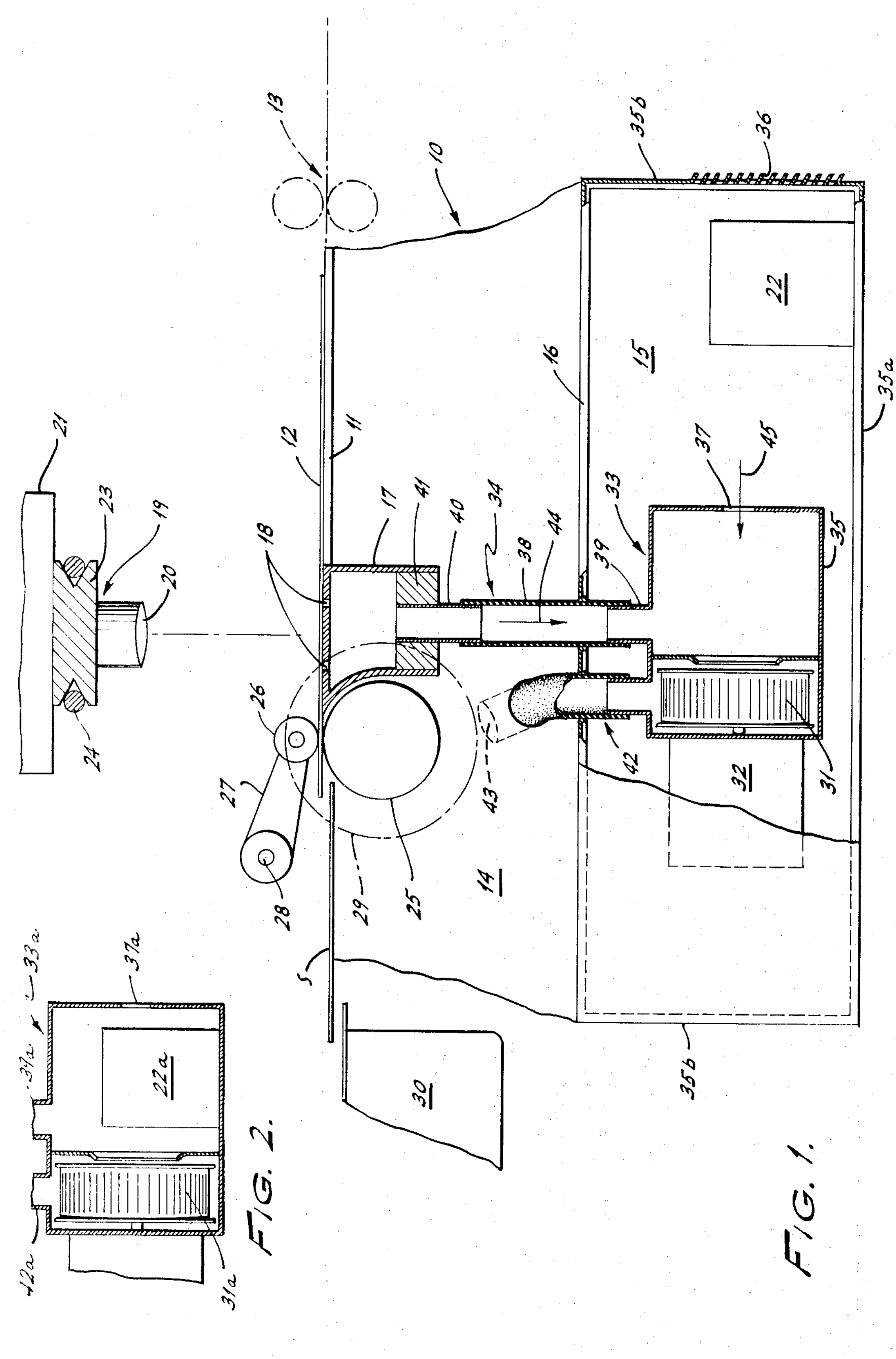

In the accompanying drawing,

FIG. 1 is a side elevational view, partly in section, showing document reading and restraining apparatus embodying the invention; and, FIG. 2 is a sectional view of the blower and associated conduits of a second embodiment of the invention.

DETAILED DESCRIPTION OF THE ILLUSTRATED EMBODIMENT

With initial reference to FIG. 1, there is illustrated, somewhat diagrammatically, apparatus embodying my invention. Illustration is limited to the apparatus located at the document reading station, since an understanding of the invention does not require detailed description of the document transporting, handling, or rejecting apparatus which might be involved.

A cabinet 10 is disposed to underlie a plate or platform 11 adapted to receive and support the documents to be read, one of which appears at 12 in the drawing. The documents may be fed thereto either manually or through the agency of automatic transporting equipment suggested by the broken lines appearing at 13. The cabinet 10 includes an upper zone 14 and a lower portion 15 separated from the upper zone by a substantially horizontal wall 16. The vacuum manifold 17 is disposed in the upper zone 14 and forms part of the platform 11. The surface of the platform is perforated, as shown at 18, in the region which overlies the manifold and is disposed beneath the reading equipment. Preferably a double row of vacuum ports is used, spaced across the reading zone. It will be apparent from the drawing that the perforated plate 11 serves as a backing for any document which is positioned to be read by the equipment carried at the reading head 19. A part of the reading equipment is optical in nature, as appears at 20, while certain electronic circuitry, which is of known type, is adapted to feed data to a package of electronic equipment 22 mounted within the lower compartment portion 15.

This invention is not concerned with the detailed nature of the particular apparatus of the reading head 21 or of the package 22, although it will be understood that suitable interconnecting circuitry (not shown) would be provided, and that signals developed in the head 21 are fed to the package for reading in accordance with known practice. A carriage member 23 is mounted upon a pair of carriage cross rods 24 to provide for scanning of the reading head 21 across the surface of the document 12.

Documents may be removed from the platform by any convenient means. One such means is the illustrated drive roller 25 which is cooperable with an idler-type pinch roller 26, carried by an arm 27 mounted for pivoting movement about an axle 28. As indicated by the broken line 29, a motor is provided to actuate the drive roller. Documents, as they are removed from the reading station, pass across a support S and may be deposited within some suitable receptacle such as the receiving hopper shown at 30.

In particular accordance with my invention, a single blower 31, mounted to be driven by a motor 32, is disposed within a plenum chamber 33 which forms a portion of the conduit system which feeds the blower. The conduit system includes first and second branches 34 and 35, respectively. In the embodiment of FIG. 1, in which the blower-containing compartment 15 is sealed, except for an opening in one end thereof, the second branch 35 should be understood to include wall structure 35*a* and 35*b*, which defines the lower compartment 15. The wall 35*b* is apertured, as by use of the louvers shown at 36. Thus it will be appreciated that the second branch in this embodiment includes the entire air flow system leading from the louvers 36 inwardly of the compartment 15 where the air flows past the package 22 and enters the conduit portion 35 through an aperture shown at 37. As referred to in more detail below, this aperture presents a predetermined air flow restriction. The first branch 34 is formed in part by rubber tubing 38, and in part by short tubing sections 39 and 40, which lead to the vacuum manifold 17 through a bushing 41. The output of the blower is directed through a conduit 42 which terminates at an opening 43, so disposed as to direct cooling air in heat exchange relation with the motor 29.

In operation of the system as thus far described, the blower 31 draws air through both of the conduit branches, as indicated by the arrows 44 and 45. When a document to be read occupies the platform 11 and blocks the apertures 18, the blower tends to pull a vacuum in the manifold 17, thereby causing the document to conform tightly to the surface of the platform and hold it in a position to be read. During this time the reading equipment, including the electronic package 22, functions and substantially the entire capacity of the blower is utilized in drawing air through the second branch, that is inwardly of the louvers 36 and through the compartment 15, where it passes in heat exchange relation with the electronic package 22. The moving air, after cooling the package, flows into the conduit portion 35 of the above-described second branch, entering said conduit portion through the aperture 37. Since the output of the blower is forced through the passage 42 and cools the motor 29, it will be apparent that the single blower 31 is serving three purposes. Not only is it serving to reduce the pressure in the manifold 17, but it also insures that there is adequate dissipation of heat from the package N and the motor 29. Particularly is this the case during the reading operation, when substantially the entire capacity of the blower is used to draw air through the second branch. As will be understood, the inlet restriction may be adjusted to determine the degree of vacuum required in the manifold 17, as long as sufficient capacity is maintained to insure cooling of the package 22.

A somewhat simpler embodiment is shown in FIG. 2, in which the blower 31*a* is enclosed in a chamber 33*a*, the right hand portion of which comprises the entire second branch through which air is induced to flow under the action of the fan. As is the case in the equipment already described, the first branch in this embodiment comprises a section of conduit 39*a* which is extended into connection with the vacuum manifold (not shown). In this embodiment, the electronic package 22*a* is disposed within the second branch and is cooled directly by air flowing through the restricted inlet 37*a*. In apparatus of this type, in which the electronic package occupies the chamber 33*a* rather than being disposed within an outer housing surrounding said chamber, it is also possible for the package itself to determine the degree of impedence required in the second branch. If this alternative is preferred, the critical factor in determining the degree of restriction is the cross-sectional area of the package 22 as compared with the cross-sectional area of the second branch defined by chamber 33*a*.

I claim:

1. In document reading apparatus: perforated platform means for supporting documents to be read; document reading means so disposed with respect to said platform means as to scan indicia carried by a document occupying said platform means; a vacuum manifold cooperable with the perforations in said platform means in the establishment, at said platform means, of a pressure reduced sufficiently to maintain such a document against said platform means in position to be scanned by reading means; blower means; conduit means including first and second branches coupled with said blower means to provide for drawing of air through said branches, said first branch being connected with said vacuum manifold, said second branch including electronic equipment cooperable with and forming part of said document reading means; and means defining an air flow restriction in said second branch, the impedence of said restriction being such as to insure that said blower means induces through said first branch sufficiently low pressure in said manifold to maintain a document in position on said platform means, while drawing cooling air in heat exchange relation with said electronic equipment.

2. Apparatus in accordance with claim 1, and further including: motor-driven means for removing documents after reading thereof; and means for directing the output air from said blower means in heat exchange relation with the motor of said motor-driven means.

3. Apparatus in accordance with claim 1, and in which said second branch includes wall structure enclosing both said electronic equipment and a chamber housing said blower, said chamber, having an aperture in one wall thereof, said aperture constituting said air flow restriction.

4. Apparatus in accordance with claim 1, and in which said second branch comprises a chamber housing said electronic equipment, wall structure defining said chamber being apertured to provide said air flow restriction.

5. In document reading apparatus; perforated platform means for supporting documents to be read; a document reader so disposed with respect to said platform means as to scan indicia carried by a document occupying said platform means; a vacuum manifold cooperable with perforations in said platform means in the establishment, at said platform means, of a pressure sufficiently reduced to maintain said document flat against said table in position to be scanned by said reader; electronic equipment cooperable with and forming part of said document reader; motor-driven blower means; and first and second conduit means through which air is drawn by said blower means, said first conduit means extending from said vacuum manifold toward said blower means, said second conduit means comprising a housing containing a plenum chamber to which said first conduit means is connected, whereby to create the low pressure required in said manifold under the influence of said blower means, said housing also containing said electronic equipment, and at least one wall portion of said plenum chamber being provided with port means through which air flows from said housing to said chamber, said port means presenting air flow restriction sufficient to insure that said blower means induces the required vacuum in said manifold while drawing cooling air in heat exchange relation with said electronic equipment.

6. Apparatus in accordance with claim 5, and further including: motor-driven means for removing documents after reading thereof; and third conduit means for directing the output air from said blower means in heat exchange relation with the motor of said motor-driven means.

* * * * *